United States Patent Office 3,101,298
Patented Aug. 20, 1963

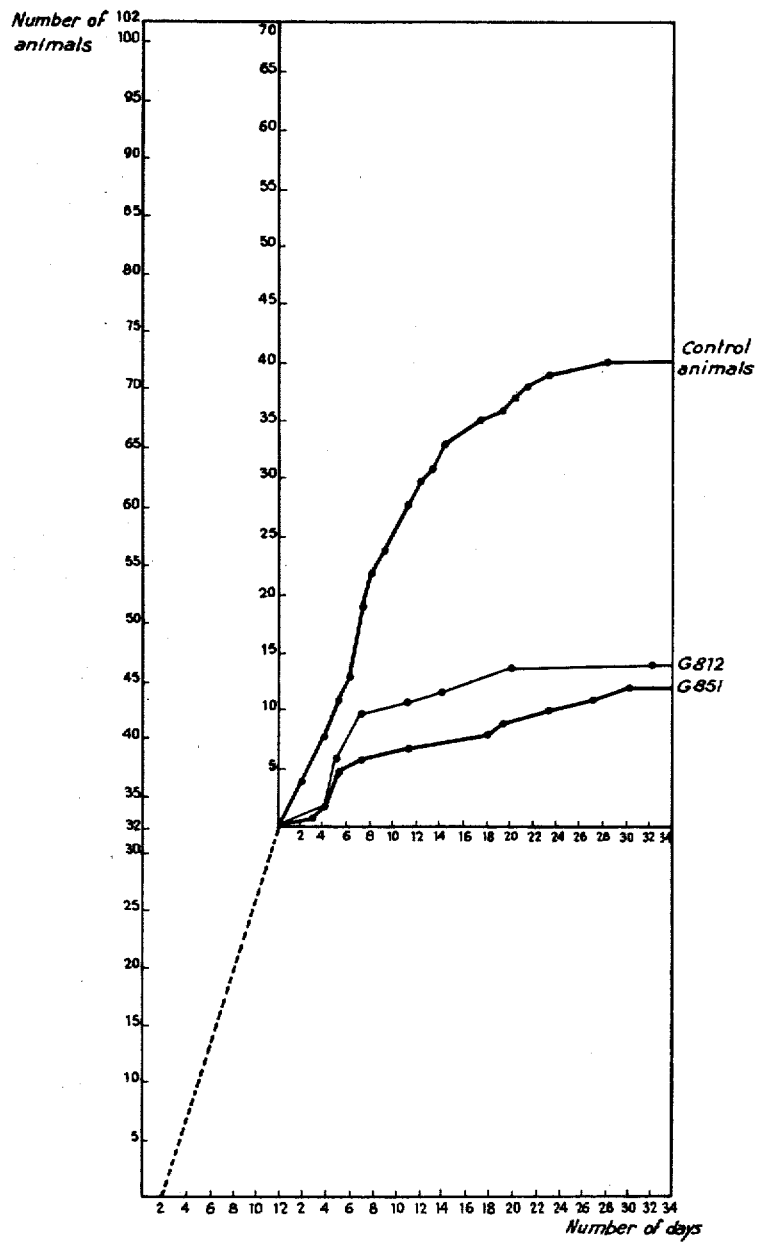

3,101,298
CHEMOTHERAPEUTIC AGENTS AND PROCESSES FOR THEIR PRODUCTION
André Girard, Paris, France, assignor, by mesne assignments, to Roussel-UCLAF, S.A., Paris, France, a corporation of France
Filed May 7, 1959, Ser. No. 811,742
Claims priority, application France June 6, 1958
14 Claims. (Cl. 167—65)

This invention relates to a group of amides derived from ω-(p-carbamyl-phenyl)-dithiobiuret, which compounds have been found to be active against poliomyelitis infection experimentally induced in mice, and to a process for their preparation.

It is an object of the present invention to produce new amide derivatives of ω-(p-carbamyl-phenyl)-dithiobiuret.

It is a further object of this invention to develop a process for producing new amide derivatives of ω-(p-carbamyl-phenyl)-dithiobiuret.

It is a still further object of this invention to produce new and useful chemotherapeutic agents active against poliomyelitis and other virus diseases.

Another object of this invention is a process of treatment of poliomyelitis and other virus diseases by ingestion of new chemotherapeutic agents.

These and other objects of the invention will become apparent as the description proceeds.

I have found that amide derivatives of ω-(p-carbamyl-phenyl)-dithiobiuret are useful chemotherapeutic agents in the treatment of poliomyelitis and other virus infections. These derivatives have the following general structural formula:

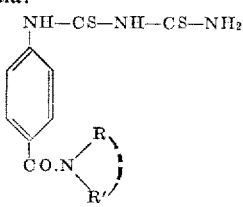

wherein R is a radical selected from the group consisting of hydrogen, alkyl and, together with R', alkylene and alkoxyalkylene, and R' is a radical selected from the group consisting of alkyl and, together with R, alkylene and alkoxyalkylene, the total number of carbon atoms contained in both R and R' being from 1 to 6. When R and R' are connected there is formed a ring containing carbon and nitrogen atoms, such as pyrrolidine, piperidine or morpholine rings.

The optimum activity against virus infection is reached when the number of carbon atoms in R + R' totals 4. For example, while the compounds having a simple functional amide group —$CONH_2$ is inactive, the compound in which R and R' are methyl radicals exhibits a slight activity. This activity is considerably increased in the diethyl amide. The substitution of propyl or isopropyl radicals for the ethyl groups of the diethylamide does not further increase the activity but instead diminishes it. Conversely, the monobutylamide (R=H and R'=n-butyl) exhibits a high activity comparable to that of diethylamide.

R and R' may be simple aliphatic radicals or, together with the nitrogen atom, may be members of a ring containing carbon and nitrogen atoms, such as Pyrrolidyl

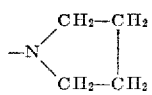

Piperidyl

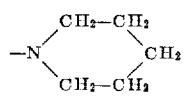

Or morpholyl

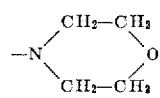

The process for the preparation of these dithiobiuret derivatives comprises the following steps:

(1) Forming an amide of p-nitrobenzoic acid by condensation of p-nitrobenzoyl chloride or a p-nitrobenzoic acid ester with a primary or secondary aliphatic amine or with a secondary alicyclic amine in the presence of an inert non-polar organic solvent, such as toluene, chloroform, etc.

(2) Selective reduction of the nitro group to the amino group in accordance with customary methods.

(3) Condensation of the p-amino carboxyamide with isoperthiocyanic acid at elevated temperatures, preferably in the presence of a polar organic solvent, such as dioxane and tetrahydrofuran, wherein the dithiobiuret generally crystallizes upon cooling, admixed with sulfur. The latter is removed from the precipitate by washing with carbon disulfide. The raw substituted dithiobiuret is purified by dissolving it in a dilute alkaline solution, followed by reprecipitation with the aid of $CO_2$.

The dithiobiuret derivatives of this type are white, microcrystalline substances. They are very slightly soluble in water, having a very weak acid character, and are fairly stable in air in the dry state, but are readily oxidized in alkaline solution.

The compounds obtained in accordance with the process of the invention are capable of reducing to a considerable regree the mortality of the animals by arresting the process of virus infection following an intra-cranial inoculation.

White mice, inoculated with poliomyelitis virus of the Lansing strain in the form of an emulsion taken from the central nervous systems of animals having succumbed to the infection, showed a mortality of 70 to 100% over a period of 30 days. The mortality curve has two peaks: a first or early peak between the 3rd and 8th days, and a second peak between the 15th and 25th days. The latter peak is the most important one. Until the 12th day the mortality is from 25% to 35%, and from the 12th to the 30th days it fluctuates between 45% and 65%.

The dithiobiuret derivatives of the invention exhibit only a moderate effect upon the first mortality phase, but when administered to the animal per os, beginning with the 12th day, at a daily dose rate of 500 mgm. per kg., they have been found to be capable of arresting the propagation of the infection and thereby reducing the mortality of the second phase by 45% to 75%. When treated as indicated, the surviving animals never show signs of paralysis.

This experimental technique of treatment beginning with the 12th day was selected in order to approach the conditions of clinical investigation on humans. The toxicity of these substances is extremely low and humans tolerate them in high doses without any other inconvenience except a modification of the leukocytic composition which is temporary and rapidly reversible.

In mice infected with the grippe virus (strain PR8), the dithiobiuret derivatives of the invention diminish the mortality by 45% in infections of medium severity.

As far as poliomyelitis is concerned, for example, it will be shown that in the course of 13 different tests involving a total of 170 control animals and 170 mice treated with the diethylamide of ω-(p-carboxy-phenyl)-dithiobiuret, the mortality in the control animals between the 12th and 30th days was 75%, while the mortality in the animals receiving 10 mgm. daily per os was only 28%, which represents a reduction in the mortality of 61.2%. When the monobutylamide of ω-(p-carboxy-phenyl)-dithiobiuret was tested on a total of 70 treated animals in 7 different tests under the same conditions as previously described, the mortality was 61% in 70 control animals as against a mortality of 18% in the treated animals, which represents a reduction in the mortality of 69.8%.

The FIGURE shows the statistical mortality curve, grouping the results of 5 different tests after inoculation with the polio virus of the Lansing strain. The number of inoculated animals is 102 per series. The median mortality in each series was 32 animals before the treatment which began on the 12th day. It may be seen that in the surviving animals, the median mortality is 40 animals for the control series, which represents a total mortality of 70.6%. In the group treated with diethylamide of ω-(p-carboxy-phenyl)-dithiobiuret (G.812), the median mortality of the surviving animals was 14 deaths, and in the group treated with the n-butylamide of ω-(p-carboxy-phenyl)-dithiobiuret (G.851), the median mortality was 12 deaths. Both of these products were administered per os at a dose rate of 10 mgm. per day per animals. It can be seen that after the administration of the above agents, a reduction of the mortality of about 70% for the period subsequent to the 12th day occurs.

The morpholide of ω-(p-carboxy-phenyl)-dithiobiuret exhibits an activity of the same order of magnitude. In 7 different tests involving a total of 70 controls and 70 treated animals the mortality from the 12th to the 30th days was 64% in the control animals and 23% in the treated mice, which represents a reduction of 64% in the mortality.

The presence of alcohol groups in radicals R and R' apparently diminishes or destroys the activity.

The following examples illustrate my invention without limiting it. More particularly, as is apparent to one skilled in the art, the nature of the amine may be varied as well as that of the solvents employed in carrying out the condensations, or also the reaction temperatures, without departing from the spirit of the invention.

EXAMPLE I

*Preparation of the Morpholide of ω-(p-Carboxy-Phenyl)-Dithiobiuret*

85 gm. of morpholine dissolved in 160 cc. of toluene are introduced into a solution of 76 gm. of p-nitrobenzoyl chloride in 160 cc. of toluene, accompanied by agitation, while maintaining the temperature at about 20° C. by exterior cooling. Water is added to dissolve the morpholine chlorhydrate. The solution is filtered to separate the insoluble portion of the amide. The remainder of the amide admixed with the toluene is washed with water and the toluene solution is evaporated. The evaporation product is added to the insoluble portion of the amide. The yield of the morpholide of p-nitrobenzoic acid is quantitative. M.P.=107–108° C. (Siebenmann et al., J. Am. Chem. Soc., 65, 2126 (1943): M.P.=101–106° C.)

The nitro amide is reduced catalytically with Adams' platinum oxide in the presence of ethanol at atmospheric pressure. After evaporation of the alcohol the residue is taken up in petroleum ether. The morpholide of p-aminobenzoic acid is recovered. M.P.=134° C.

22.7 gm. of the amino-amide thus obtained and 15 gm. of isoperthiocyanic acid are introduced into 40 cc. of dioxane, and the mixture is heated on an immersed water bath for three hours. The precipitate obtained by cooling the mixture is separated and washed with carbon disulfide and then with cold methanol.

The last traces of sulfur are eliminated by dissolving the moist precipitate in ½N NaOH, decolorizing the solution, if necessary, with animal charcoal and reprecipitating with CO₂. The precipitate is separated, washed with water and then with methanol, and dried out of contact with the air, yielding the morpholide of ω-(p-carboxy-phenyl)-dithiobiuret of the formula:

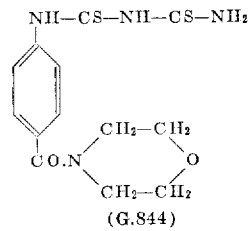

(G.844)

The substance decomposes upon gradually heating it and melts without a sharp melting point around 185° C. Instantaneous M.P.: 200–205° C., accompanied by decomposition.

EXAMPLE II

*Preparation of the n-Butylamide of ω-(p-Carboxy-Phenyl)-Dithiobiuret*

The mono-n-butylamide of ω-(p-carboxy-phenyl)-dithiobiuret is prepared under conditions identical to those of Example I, except that an equimolar quantity of mono-n-butylamine is substituted for the morpholine.

The p-nitro mono-n-butylbenzamide is poorly soluble in toluene and practically completely separates out. It melts at 103–104° C. [Wenker, J. Am. Chem. Soc., 60, 1081 (1938)]. The p-amino amide prepared as in Example I has an M.P. of 98–99° C. (Wenker, ibid.), is very soluble in alcohol and crystallizes in isopropyl ether.

21.5 gm. of the above amino-amide, 15 gm. of isoperthiocyanic acid, and 40 cc. of dioxane are heated on a water bath for 3 hours.

In this case the substituted dithiobiuret does not separate out upon cooling. The major portion of sulfur is eliminated by filtration. Water is slowly added to separate out the reaction product and it is then filtered off, washed with water and with a very small quantity of methanol.

The reaction product is then dissolved in 250 cc. of water, 15 cc. of 10 N NaOH are added, and the solution is filtered with a charcoal decolorizing agent, and the product is reprecipitated with CO₂. The instantaneous M.P. is 185° C. (accompanied by decomposition).

It has the formula

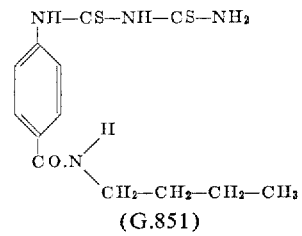

(G.851)

EXAMPLE III

*Preparation of the Piperidide of ω-(p-Carboxy-Phenyl)-Dithiobiuret*

The piperidide of ω-(p-carboxy-phenyl)-dithiobiuret (G. 847) is prepared in a manner identical to that of Example I by substituting an equimolar amount of piperidine for morpholine. The nitro-amide melts at 120° C. [Franchimont et al., Rec. Trac. Chim. Pays-Bas, 26, 232; Wenker, J. Am. Chem. Soc., 60, 1081 (1938)].

The amino-amide is obtained by catalytic reduction in alcohol. It melts at 162° C.

The substituted dithiobiuret thus obtained has the formula:

NH—CS—NH—CS—NH₂
|
C₆H₄
|
CO.N(CH₂—CH₂)₂CH₂

(G.847)

and melts at 205–210° C. (decomposition).

EXAMPLE IV

*Preparation of the Pyrrolidide of ω-(p-Carboxy-Phenyl)-Dithiobiuret*

By substituting an equimolar amount of pyrrolidine for the piperidine in the preceding example, a substance of the formula:

NH—CS—NH—CS—NH₂
|
C₆H₄
|
CO.N(CH₂—CH₂)₂

(G.848)

is obtained which melts at 200–205° C., accompanied by decomposition.

It is a white powder, almost insoluble in water, soluble in dilute alkalies and in alcohol.

The intermediate substances are:
The nitro-amide: M.P. 95–96° C.
The amino-amide: M.P. 182° C.

EXAMPLE V

*Preparation of the Diethylamide of ω-(p-Carboxy-Phenyl)-Dithiobiuret*

NH—CS—NH—CS—NH₂
|
C₆H₄
|
CO.N(C₂H₅)₂

(G.812)

The condensation of p-nitrobenzoyl chloride with diethylamine under the above-described conditions of Example I leads to the nitro-amide. M.P. 65° C. [Wenker, J. Am. Chem. Soc., 60, 1081 (1938)].

The reduction of the nitro group may advantageously be effected with the aid of powdered iron in aqueous butanol at the boiling point. The p-amino-diethylbenzamide melts at 125° C. (Wenker, ibid.).

The substituted dithiobiuret, prepared as previously described in the presence of dioxane, crystallizes upon cooling. Purified as indicated, it is obtained in the form of a microcrystalline white powder which is practically insoluble in water, and slightly soluble in methanol and ethanol (1.2 gm. per 1000). Instantaneous M.P.: 220–225° C. (decomposition).

While I have given specific examples of the practice of my invention, it is to be understood that various modifications and changes can be made in the practice of my invention as would occur to a person skilled in the art. Such changes and modifications can be made without departing from the spirit of my invention and the scope of the following claims.

I claim:

1. Amide derivatives of ω-(p-carboxy-phenyl)-dithiobiuret having the structural formula

NH—CS—NH—CS—NH₂
|
C₆H₄
|
CO.N(R)(R')

wherein R is a radical selected from the group consisting of hydrogen, alkyl and, together with R', alkylene and alkoxyalkylene, and R' is a radical selected from the group consisting of alkyl and, together with R, alkylene and alkoxyalkylene, the total number of carbon atoms contained in both R and R' being from 4 to 5.

2. The ω-(p-carbomorpholyl-phenyl)-dithiobiuret having the structural formula

NH—CS—NH—CS—NH₂
|
C₆H₄
|
CO.N(CH₂—CH₂)₂O

3. The n-butylamide of ω-(p-carboxy-phenyl)-dithiobiurent having the structural formula

NH—CS—NH—CS—NH₂
|
C₆H₄
|
CO.N(H)(CH₂—CH₂—CH₂—CH₃)

4. The ω-(p-carbopiperidyl-phenyl)-dithiobiuret having the structural formula

NH—CS—NH—CS—NH₂
|
C₆H₄
|
CO.N(CH₂—CH₂)₂CH₂

5. The ω-(p-carbopyrrolidyl-phenyl)-dithiobiuret having the structural formula

NH—CS—NH—CS—NH₂
|
C₆H₄
|
CO.N(CH₂—CH₂)₂

6. The diethylamide of ω-(p-carboxy-phenyl)-dithiobiuret having the structural formula

NH—CS—NH—CS—NH₂
|
C₆H₄
|
CO.N(CH₂—CH₃)₂

7. The process of reducing the severity of virus infections in mammals which comprises ingesting a small but effective dose of an amide derivative of ω-(p-carboxyphenyl)-dithiobiuret having the structural formula

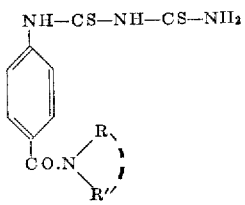

wherein R is a radical selected from the group consisting of hydrogen, alkyl and, together with R', alkylene and alkoxyalkylene, and R' is a radical selected from the group consisting of alkyl and, together with R, alkylene and alkoxyalkylene, the total number of carbon atoms contained in both R and R' being from 4 to 5.

8. The process of claim 7 wherein said amide derivative is ingested at the rate of about 500 mgm. per kg. of body weight per os.

9. A process of reducing the incidence of mammal mortality due to infections of poliomyelitis virus which comprises feeding said infected mammals an amide derivative of ω-(p-carboxy-phenyl)-dithiobiuret having the structural formula

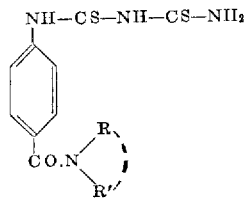

wherein R is a radical selected from the group consisting of hydrogen, alkyl and, together with R', alkylene and alkoxyalkylene, and R' is a radical selected from the group consisting of alkyl and, together with R, alkylene and alkoxyalkylene, the total number of carbon atoms contained in both R and R' being from 4 to 5.

10. The process of claim 9 wherein both R and R' represent ethyl radicals.

11. The process of claim 9 wherein R' represents the n-butyl radical and R represents hydrogen.

12. The process of claim 9 wherein R and R' together represent the divalent 3-oxa-pentalene radical.

13. A process for the reduction of the severity of poliomyelitis infection in mammals which comprises treating said infected mammals by ingesting a mixed pharmaceutical preparation comprising an amide derivative of ω-(p-carboxyphenyl)-dithiobiuret having the structural formula

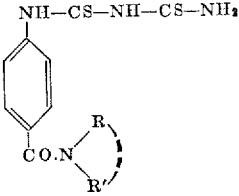

wherein R is a radical selected from the group consisting of hydrogen, alkyl and, together with R', alkylene and alkoxy-alkylene, and R' is a radical selected from the group consisting of alkyl and, together with R, alkylene and alkoxy-alkylene, the total number of carbon atoms contained in both R and R' being from 4 to 5, and an inert excipient.

14. A mixed pharmaceutical preparation for use in the treatment of patients having a poliomyelitis infection which comprises an amide derivative of ω-(p-carboxyphenyl)-dithiobiuret having the structural formula

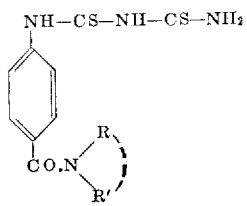

wherein R is a radical selected from the group consisting of hydrogen, alkyl and, together with R', alkylene and alkoxy-alkylene, and R' is a radical selected from the group consisting of alkyl and, together with R, alkylene and alkoxy-alkylene, the total number of carbon atoms contained in both R and R' being from 4 to 5, and an inert excipient.

References Cited in the file of this patent

UNITED STATES PATENTS

| | | |
|---|---|---|
| 2,410,862 | Bousquet et al. | Nov. 12, 1946 |
| 2,804,422 | Schumann et al. | Aug. 27, 1957 |
| 2,841,583 | D'Amico | July 1, 1958 |
| 2,891,059 | Malz et al. | June 16, 1959 |
| 2,917,432 | Timmis | Dec. 15, 1959 |
| 3,045,046 | Brown et al. | July 17, 1962 |

OTHER REFERENCES

Sexton: "The Organic Chemist's Approach to Chemotherapy," in vol. III, S.E.B. Symp. No. III (1949), pp. 1–13 of Selective Toxicity and Antibiotic Symposium of Soc. Exp. Biology (Gr. Br.), 1949.

Girard et al.: "Experimental Poliomyelitis of Mice," Compt. Rendus, vol. 251, No. 1, pp. 164–166, July 4, 1960. Abstract (English) in Chem. Abstracts, vol. 54, No. 22, #25270i–#25271a, November 25, 1960.

Weinstein et al.: "The Antiviral Activity of Urea Derivatives," Antibiotics and Chemotherapy, vol. 7, pp. 443–448 (1957); Chem. Abstracts 52, #4834i (1958).

Girard et al.: "Dithiobiuret Derivatives," Chem. Abs. 52, #1239i (1958).

Knox et al.: "Influence of Pyrimidine Analogs and Related Compounds on the Propagation of Poliomyelitis in Tissue Cultures," J. Pharmacol. Expt'l Therap., vol. 119, pp. 495–505 (1957); Chem. Abstracts 51, #13056F (1957).

Woolfe: "The Trypanocidal Activity of Dithiobiuret Derivatives," Brit. J. Pharmacol., vol. 8, pp. 420–423 (1953); Chem. Abstracts 48, #4119i (1954).

Foye et al.: "Dithiobiuret Analogs of Tibione," J. Am. Pharm. Assoc., vol. 42, pp. 31–32 (1953); Chem. Abstracts 47, #3524i (1953).

UNITED STATES PATENT OFFICE

CERTIFICATE OF CORRECTION

Patent No. 3,101,298                                      August 20, 1963

André Girard

It is hereby certified that error appears in the above numbered patent requiring correction and that the said Letters Patent should read as corrected below.

Column 4, line 50, for "185° C." read -- 185-190° C. --.

Signed and sealed this 13th day of October 1964.

(SEAL)
Attest:

ERNEST W. SWIDER
Attesting Officer

EDWARD J. BRENNER
Commissioner of Patents